G. F. GOSS.
POOL BALL RACK.
APPLICATION FILED NOV. 22, 1909.

971,128.

Patented Sept. 27, 1910.

Witnesses
E. F. Stewart
F. T. Chapman

Inventor
George F. Goss.
By C. A. Snow & Co.
Attorneys

G. F. GOSS.
POOL BALL RACK.
APPLICATION FILED NOV. 22, 1909.

971,128.

Patented Sept. 27, 1910.

Witnesses
Inventor
George F. Goss.
By C. A. Snow & Co.
Attorneys

UNITED STATES PATENT OFFICE.

GEORGE FRANK GOSS, OF WALLACETON, PENNSYLVANIA.

POOL-BALL RACK.

971,128.  Specification of Letters Patent.  Patented Sept. 27, 1910.

Application filed November 22, 1909. Serial No. 529,371.

*To all whom it may concern:*

Be it known that I, GEORGE FRANK GOSS, a citizen of the United States, residing at Wallaceton, in the county of Clearfield and State of Pennsylvania, have invented a new and useful Pool-Ball Rack, of which the following is a specification.

This invention has reference to devices used in connection with pool tables for automatically collecting the balls which have been driven into the pockets, and its object is to provide a device of this character wherein the parts are of simple construction and efficient in operation and which may be cheaply manufactured and readily applied to pool tables without changing the structure of the latter.

In accordance with the present invention the rack is provided with a series of superposed runways for the balls into any one of which balls coming from the pockets may be directed and suitable mechanism is provided which, at the will of the operator may be set to cause balls coming from any one or more of the pockets to be directed into any chosen one of the runways, and the balls may be permitted to accumulate in the runways until a sufficient number to constitute a game become lodged in some one runway when by a signal device constituting part of the invention notice is given that the game has been finished.

The invention also comprises means whereby a signal may be produced each time a ball enters the ball rack.

The invention will be best understood from a consideration of the following detail description taken in connection with the accompanying drawings forming a part of this specification, in which drawings.

Figures 1, 2, 12, 13:
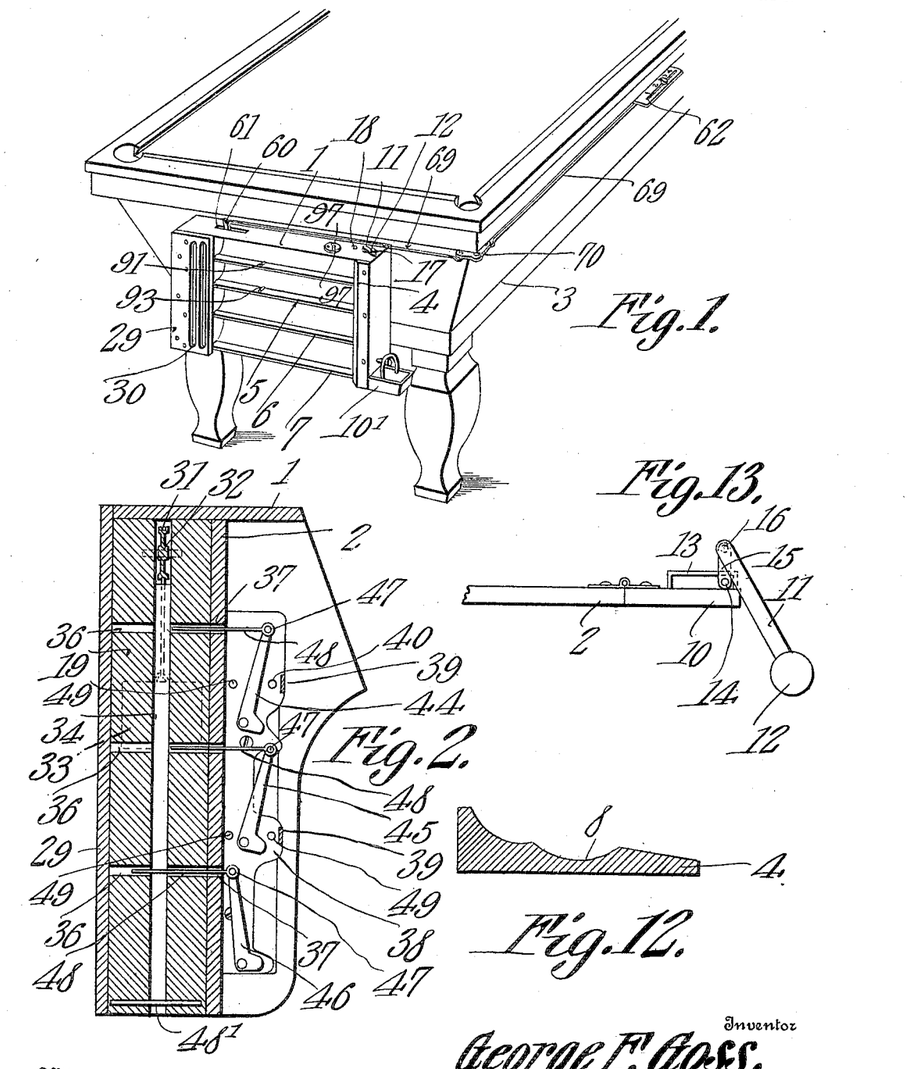
Figure 1 is a perspective view of one end of a pool table showing the rack attached.
Fig. 2 is a section on the line A—B of Fig. 3.
Fig. 12 is a cross section of one of the runways.
Fig. 13 is a top view of the gate and adjacent portion of the partition carrying it together with the operating mechanism for the gate.

The improved pool ball rack comprises a suitable casing 1 divided into front and rear compartments by a central longitudinal partition 2, the front compartment being that ordinarily visible and the rear compartment being that adjacent to the end of the pool table indicated at 3 in Fig. 1. In the front compartment and extending throughout the greater portion of the length thereof are runways 4, 5, 6, and 7, there being four such runways indicated in the drawings, but it will be understood that the invention is not limited to any particular number of runways, the number shown being illustrative only. These runways are slightly inclined to the horizontal from one end toward the other so that balls deposited on the higher end will gravitate toward the lower end. The runways 4 to 7 inclusive are formed each with a longitudinal groove 8 for holding the balls to the runway but permitting the ready removal of any one or more of the balls deposited on the runways at will. At the lower end each runway is cut away as shown at 9 to the depth of the bottom of the groove 8 so that a ball reaching the cutaway portion 9 may escape from the runway at this point. The partition 2 stops short of the cut away portions 9 so that balls leaving the runways at the lower ends thereof will pass into the rear compartment of the rack and fall into a suitable basket or receptacle 10′ which may be provided for the purpose. In order to hold the balls in the runways there is hinged to the partition 2 at the end adjacent to the cut-away portions 9 a door or gate 10, this gate being under the control of a lever 11 mounted in the casing 1 and having a handle 12 accessible to an operator so that when the lever 11 is moved in one direction the door 10 will be swung about its hinges in a direction away from the cut-away portions 9 of the several racks and when swung in the other direction will close these cut-away portions to a sufficient extent to prevent the passage of the balls therethrough. The gate 10 is provided with an elongated socket 13 engaged by a pin 14 on the shorter arm 15 of the lever 11, the pivot 16 of the lever extending through the top of the casing. The relation of the longer and shorter arms of the lever 11 is such that when the lever is at one extent of its movement determined by a stop 17 on the top of the casing, the arm 15 is perpendicular to the corresponding face of the gate 10, which latter is then closed in position to prevent the escape of balls from the runway, and when the lever is at the other limit of its travel, determined by a stop 18 on the casing, the gate 10 is swung to a position approximately at right angles to the plane of the partition 2, and the balls may then freely escape through the cut-away portions 9 of the runways. It will be observed that when the gate is closed the short arm 15 of the lever 11 effectually locks the gate in such position. At the other end of the casing 1, that is at the end agreeing to the higher ends of the runways there is an upright partition 19 spaced a short distance from the like end of the casing and between this partition 19 and the higher ends of the runways there is provided a space designed to receive a carrier 20 for balls entering the front compartment of the rack through a suitable passage 21 through the partition 2 at a point coincident with the upper end of the space between the partition 19 and the adjacent ends of the runways.

The carrier 20 may be formed of two parallel side members 21' joined by an intermediate cross member 22 and projecting in a direction substantially at right angles to the side members 21' is a plate 23 having a central longitudinal cut-away portion 24 in which is pivoted a bent plate 25 in such manner that either end of the plate may be brought with its upper surface in the plane of the upper surface of the plate or bracket 23, in which case the other end of the plate or lever 25 is elevated above such plane. The outer end of the lever 25 extends to the outer end of the plate or bracket 23 while the inner end of the lever 25 extends to and through the supporting frame of the carrier and is provided with an angle extension 26 beyond the back of the frame of the carrier. The carrier frame made up of the side members 21' and cross member 22 is mounted to move along the face of the partition 19 toward the upper ends of the runways 4–7, the side members 21' traveling in a groove 27 appropriately located in the partition 2 and another groove 28 in a face plate 29 applied to the end of the casing 1 under consideration and covering the outer edge of the partition 19 and overlapping the higher ends of the runways 4–7. The cover 29 is provided with elongated openings 30 opposite the passage between the partition 19 and the higher ends of the runways and it is along this passage way that the carrier 20 is adapted to travel in a manner to be described and may be arrested at different stages in its travel, the points of stopping being when the plate or bracket 23 is in line with some one of the runways 4–7.

Fast to the cross bar 22 of the carrier is a cord or strand 31 passing up over a pulley 32 and thence down into the space between the partition 19 and the adjacent end of the casing 1 where the cord 31 is made fast to a weight 33 sufficient to overbalance the carrier and so constrain the latter to the uppermost position, but this weight is insufficient to overbalance or even counter-balance the weight of the carrier and a ball lodged thereon so that when a ball is deposited on the carrier the latter will move downward against the effect of the weight 33 until arrested by suitable stop mechanism at a predetermined one of the runways 4 to 7.

The partition 19 is provided on the face traversed by the carrier 20 with a longitudinal groove 34 in which travels the angle extension 26 of the lever 25. The partition 19 is traversed by passages 36 at appropriate points, these passages 36 intersecting the groove 34, while matching passages 37 are provided through the partition 2.

Figures 9, 10:
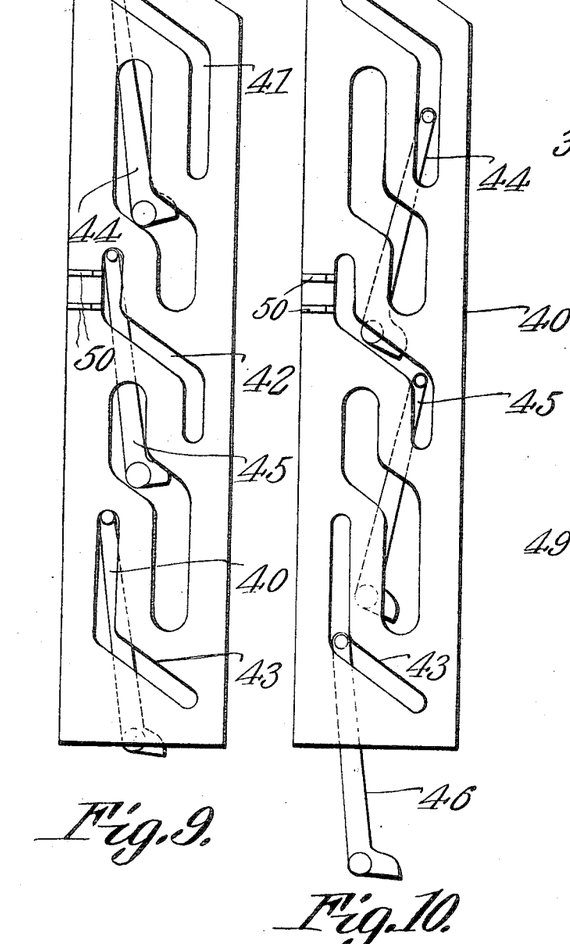
Figs. 9 and 10 are views of a portion of the setting mechanism in two operative positions.
Figure 11:
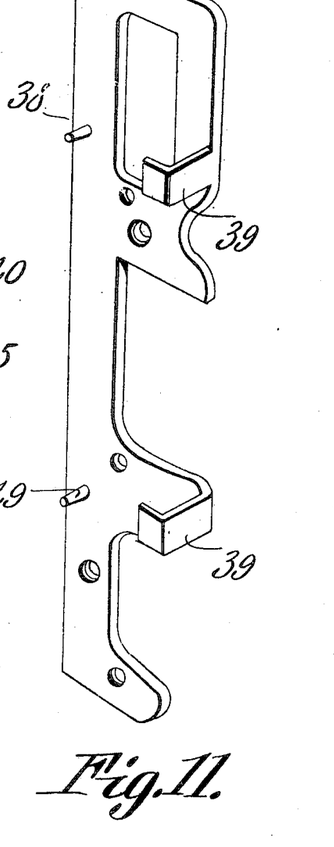
Fig. 11 is a perspective view of a portion of the setting mechanism, constituting a supporting bracket for the moving parts thereof.
Figure 14:
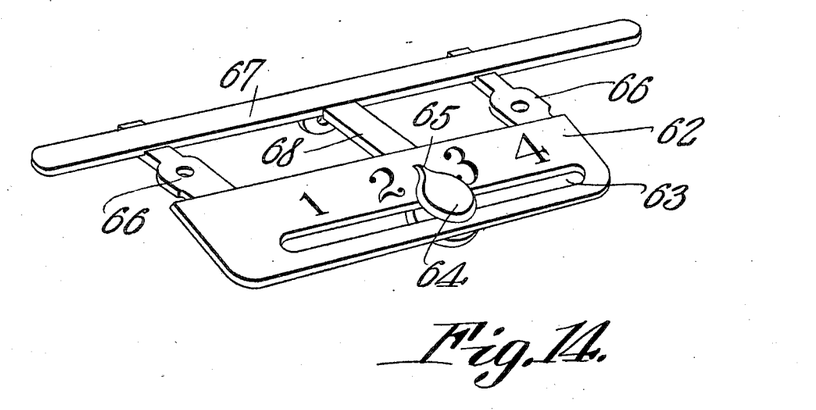
Fig. 14 is a perspective view of the indicator and accessible manipulating means for the rack.
Figures 15, 16:
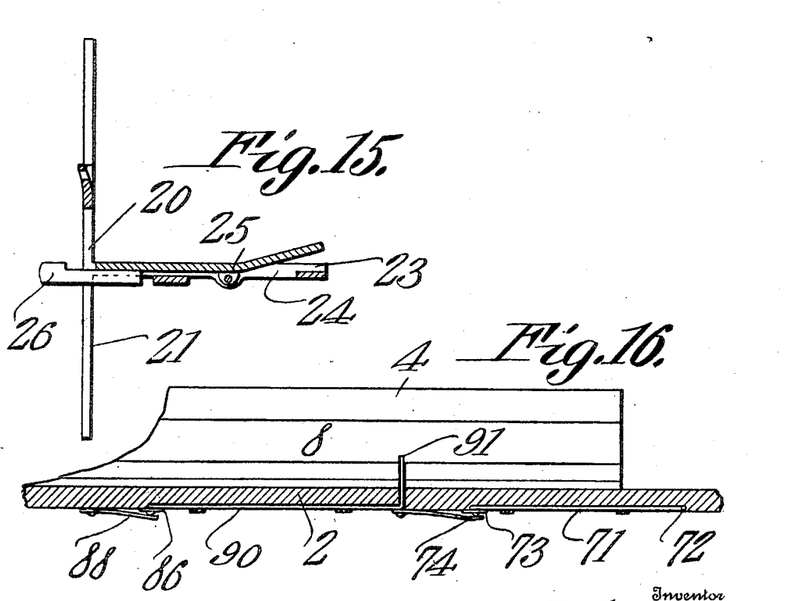
Fig. 15 is a central section through the carrier.
Fig. 16 is a section on the line C—D of Fig. 4.

Fast to the casing within the rear compartment at the end thereof corresponding to the end of the front compartment wherein is lodged the carrier 20, is a bracket 38 best shown in Fig. 11, this bracket being of open construction for lightness and economy of material, and furthermore this bracket is provided at appropriate points with overhanging members 39 constituting guides for a sliding plate 40 also of open construction for economy of material. In the particular construction of the plate 40 shown in the drawings and particularly in Figs. 9 and 10, this plate has three slots 41, 42 and 43 produced therein, the slot 41 having its upper portion at an angle to the length of the slide 40 while its lower portion is parallel with the long sides of the said slide, the two portions being of about the same length. The slot 42 has an intermediate inclined portion of about the same length as the inclined portion of the slot 41 while the two ends are extended in opposite directions from the inclined portion in parallelism with the long sides of the slide. The slot 43 which is at the end of the slide 40 remote from the slot 41 is similar to the slot 41 except that the relation of the inclined and longitudinal portions are reversed.

Mounted on the bracket 38 by means of suitable pivot studs or screws are three arms 44, 45, and 46 in the particular structure shown in the drawings. Each of these arms at its free end is provided with a lateral pin 47 to which is pivoted a rod 48, this rod being formed into an eye surrounding the pin 47. The rods 48 enter the passages 36, first traversing the passages 37, and the proportions of the parts are such that in one position of the rock arms 44, 45 and 46 the respective rod 48 will have its end remote from the arm withdrawn from a position traversing the groove 34 while in the other position of the respective arms 44, 45 or 46 the rod 48 will traverse such groove 34. The pins 47 are of such length as to enter the grooves 41, 42 and 43 respectively while the slide 40 is held away from the bracket 48 by spacing lugs 49, the overhanging members 39 preventing movement of the slide 40 away from the bracket 38. The slide 40 is provided about midway its length with spaced lugs 50 on one face near the edge of the slide remote from that engaged by the overhanging members 39.

Secured to the partition 2 within the rear compartment of the pool ball rack is a bracket 51 formed near one end with an eye 52 to receive a pivot stud 53 formed on a lever 54 one end 55 of which latter enters between the lugs 50 on the slide 40 and the other end of which carries a segmental weight 56 sufficient to counter-balance the slide 40 and this weight has formed on its inner edge a series of notches 57 engaged by the end 58 of a spring 59 made fast to the partition 2. Fast to the lever 54 in radial relation to the stud 53, is an arm 60 projecting through the top of the casing through a slot 61 therein, so that the arm 60 may be rocked about the axis of the lever 54 to cause the lever to move in one direction or the other, thus causing a like movement of the slide 40 along the bracket 38. Such movement is resisted by the spring 59, the end 58 of which engages in one or the other of the notches 57 of the counterweight 56 in such manner as to hold the lever in different positions of adjustment but at the same time yielding to a sufficient force applied to the arm 60.

In one position of the slide 40, that is the lowermost position, the pins 47 are all in those portions of the respective slots 41, 42 and 43 adjacent to the partition 2. In this position of the parts all the rods 48 traverse the groove 34. If now the lever 54 be moved in a direction to elevate the slide 40 for a distance sufficient to cause the engaging end 58 of the spring 59 to move from the first notch of the weight 56 to the second notch thereof then the end of the arm 44 carrying the pin 47 engaging the inclined portion of the slot 41 will be moved by such inclined portion of the slot toward the outer edge of the slide 40 while the pins of the arms 45 and 46 will be unaffected since they simply traverse the portions of the slots 42 and 43 respectively which are parallel with the long sides of the slide 40. On the next movement of the lever 54 in the same direction as before the arm 45 is moved about its pivot by the inclined portion of the slot 42 while the arm 44 traveling in the upright portion of the slot 41 and the arm 46 traveling in the upright portion of the slot 43 maintain the relations already established. The third and final movement of the lever 54 will cause the arms 44 and 45 to maintain their positions with the rods 48 withdrawn from the groove 34 and the inclined portion of the slot 43 causes the active movement of the arm 46 to withdraw the rod 48 controlled thereby from its position traversing the groove 34. It will thus be seen that the progressive movement of the slide 40 causes the successive movements of the arms 44, 45 and 46 to withdraw the rods 48 from their positions traversing the groove 34 or to positions traversing the groove 34 in the reverse order to that of withdrawal. Assuming first that the carrier 20 is in its normal elevated position and that the slide 40 is in its lowermost position so that all the rods 48 are in position traversing the groove 34 then a ball coming from any one of the pockets of the pool table, these pockets all being connected by appropriate conduits, as is common in structures of this character, to the passage 21, will move upon the carrier and its weight will cause the carrier to move downwardly. This movement is arrested by the uppermost one of the rods 48 traversing the groove 34 in the path of the projection 26 of the lever or plate 25 so that as the carrier moves downwardly the end of the plate 25 carrying the extension 26 is raised before the carrier is arrested in its movement and the ball is given an impulse sufficient to move it upon the runway 4 along which the ball then gravitates to the lower end of the runway and if the gate 10 be open, the ball will pass through the cutaway portion 9 into the rear compartment and fall into the basket 10'. If the gate be closed the ball will simply gravitate to the lower end of the runway 4 and there stop. As soon as the ball rolls from the carrier the latter returns to its elevated position under the action of the weight 33 ready to receive the next ball, and assuming that the lever 54 is still in the initial position the second and succeeding balls passing through the opening 21 will be diverted under the runway 4 and either pass to the basket 10 or accumulate on said runway, depending on the position of the gate 10. If it be desired to divert the balls to another one of the runways then the lever 54 is moved to an appropriate extent to lift the slide 40 sufficiently to rock the arm 44 in a direction to withdraw its rod 48 from the path of the extension 26, and if it be desired to direct the balls to a lower runway then the movement of the lever is made such that the slide 40 will have a corresponding travel sufficient to withdraw the second or third rod 48 from the path of the extension 26. The carrier will then fall under the weight of a received ball until arrested by the engagement of the undisturbed rod 48 or with a fixed rod 48' traversing the groove 34 in proper relation to the lowermost one of the runways. Under such circumstances the ball will be diverted into the appropriate runway and the carrier wil return to its initial position to receive the second and subsequent balls and dropping under each one in succession to cause it to be directed into the appropriate runway.

Figure 3:
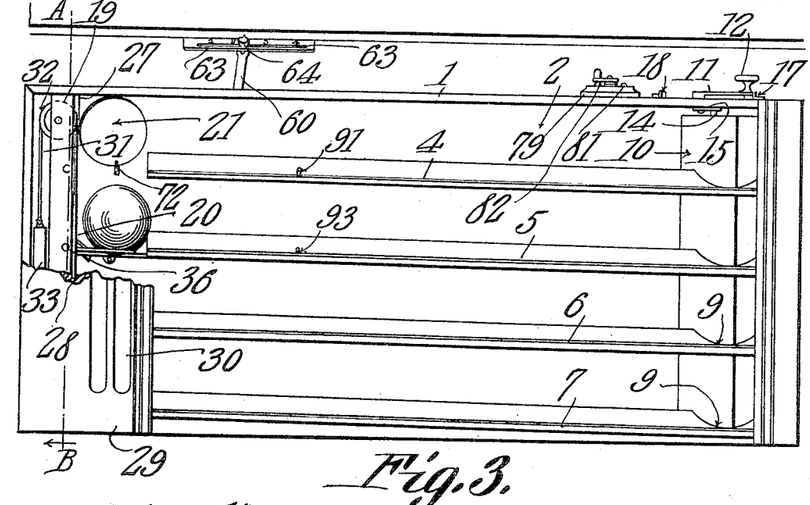
Fig. 3 is a front elevation of the rack as applied to a table, a portion of the rack being broken away and the setting device being shown applied to the table adjacent to the rack.
Figure 4:
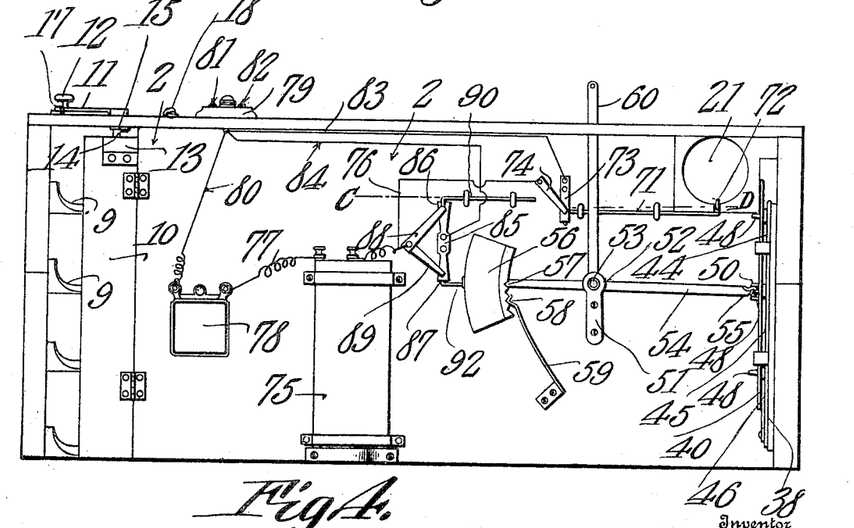
Fig. 4 is a view of the rack from the side opposite that shown in Fig. 3.
Figures 5, 6, 7, 8:
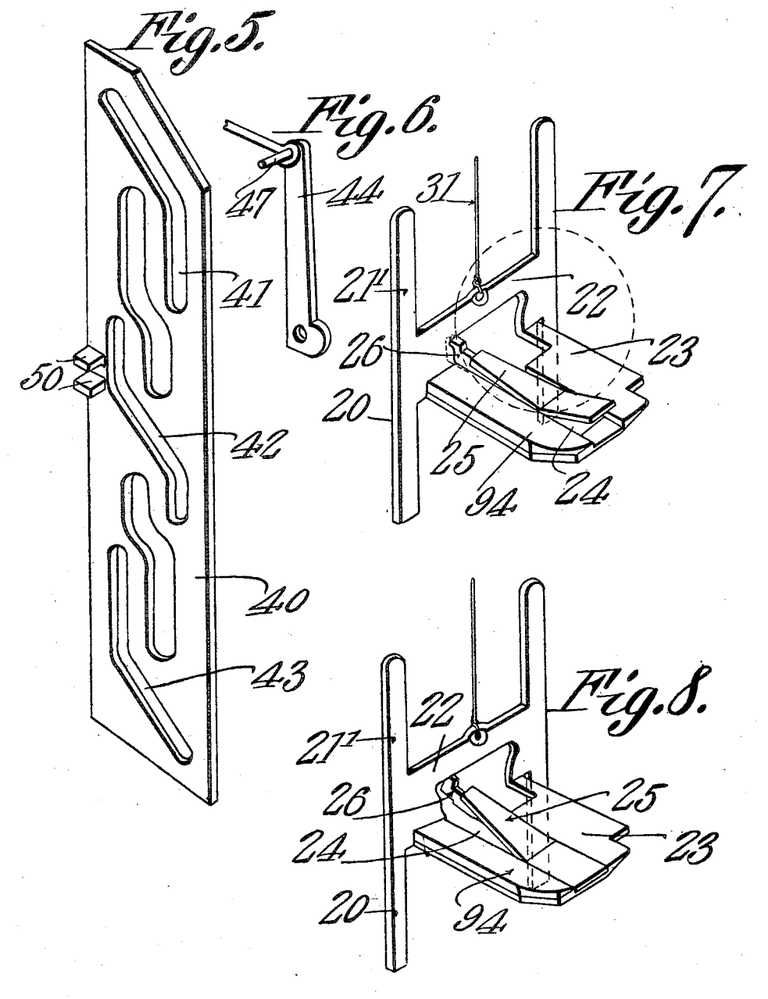
Fig. 5 is a perspective view of the sliding plate used in connection with the setting mechanism.
Fig. 6 is a perspective view of a lever used in connection with the setting mechanism.
Figs. 7 and 8 are perspective views of a carrier for the balls for conveying them to different runways of the rack, the two figures showing different operative positions of parts of the carrier.

The lever arm 60 may be adjusted to its several positions in any suitable manner and from any position along the table 3. The adjusting device may comprise a plate 62 provided with a longitudinal slot 63 through which extends the stem of a manipulating button 64 provided with a pointer 65 so that the button may be brought opposite suitable indices on the visible surface of the plate 62. Brackets 66 are provided for supporting the plate 62 at any point on the table 3 and these brackets carry a sliding bar 67 serving as a support and guide for the button 64 the stem of which latter may be connected to an extension 68 of the bar 67 which extension under-rides the plate 62 and there receives the stem of the button 64. The bar 67 may be directly connected to the free end of the arm 60 as indicated in Fig. 3 or through the intermediary of links 69 and angle levers 70 permitting the location of the manipulating button 64 and the parts carrying the same at any appropriate point on the table 3.

It is desirable that a signal be actuated either by each ball as it passes to the carrier 20 or by an accumulation of balls upon the runways. For this purpose there is mounted on the rear face of the partition 2 a rock shaft 71 having an angle extension 72 projecting into the path of the balls passing through the opening 21 toward the carrier 20. The other end of the shaft 71 has an extension in the path of which is an elastic contact 73 fast to the corresponding face of the partition 2 so that when a ball engages the extension 72 of the shaft 71 and so rocks the shaft the spring contact 73 will be forced against its normal tendency in a direction away from the corresponding face of the partition 2. In the path of the contact 73 is another contact 74 also mounted on the partition 2 but normally out of contact with the contact terminal 73 but when the shaft 71 is rocked by the engagement of a ball with the end 72, the contact terminal 73 is moved into engagement with the contact terminal 74 and establishes a circuit thereat. Secured to the partition 2 within the rear compartment of the pool ball rack, or elsewhere located if desired, is a battery 75 or other suitable source of electric current connected on one side by a conductor 76 to the contact terminal 74 and on the other side by a conductor 77 to a signal device 78 which in the particular showing of the drawings is illustrated as a buzzer.

Mounted on the casing 1 within ready access of an operator is a switch 79, preferably a two point switch. The arm of the switch is connected by a conductor 80 to the side of the buzzer 78 opposite from that connected to the battery while the two points of the switch indicated at 81 and 82 are connected to respective conductors 83 and 84. The conductor 83 is connected to the contact terminal 73 and the conductor 84 is connected to a plate 85 secured to the back of the partition 2 and having oppositely directed elastic arms 86—87 respectively in the path of which are elastic contact terminals 88—89 respectively connected to the conductor 76, the terminals 88 and 89 being normally out of contact with the arms 86 and 87 which also constitute circuit terminals. The arm 86 is in the path of one end of a rock shaft 90 the other end 91 of which extends through the partition 2 in position to be engaged by a ball on the runway 4. In operative relation to the arm 87 is another rock shaft 92 having an end 93 extending through the partition 2 into the path of balls traversing the runway 5. While only two such rock shafts are shown it will be understood that a greater number may be used if desired. By a suitable manipulation of the switch 79 the contact terminals 73 and 74 may be included in the circuit of the battery and buzzer, or the contact terminals 86, 87 and 88, 89 may be so included. When the switch arm of the switch 79 is upon the switch point or terminal 81 then balls rolling along the runways 4 and 5 will depress the ends 91 or 93 of the respective shafts 90 or 92 and cause the actuation of the buzzer 78 by the momentary closure of the circuit at the contacts 88 or 89 thus indicating that balls have traversed these runways. Assuming that the gate 10 is closed then the balls will accumulate in the runways 4 and 5, assuming that only these two runways are being used and ultimately a sufficient number of balls will accumulate in one or the other of the runways to cause the last ball received to rest on the extension 91 or 93 as the case may be thus maintaining the circuit closed and the buzzer will then operate continuously thereby indicating that the number of balls necessary to constitute a game have been received into one or the other of the runways, and which of the two runways has received the requisite number of balls may be readily ascertained by inspection. If the balls are simply to be allowed to pass to the basket 10', the gate 10 under these circumstances being constantly open, then the switch lever of the switch 79 is moved onto the contact point or terminal 82 and each time a ball traverses the opening 21 a signal will be produced.

It will be observed that in the normal position of the plate or lever 25 the end toward the runways is elevated so that a ball moving onto the carrier is prevented from rolling therefrom by the elevated angle end of the plate or lever 25. The ball is furthermore prevented from striking the cover 29 with too much force by an inclined section 94 of some yielding material applied to the plate 23 adjacent to the cover 29. When the carrier 20 drops under the weight of the ball the lever 25 is rocked by the engagement of the extension 26 with a rod 48 or 48' and the normally upwardly inclined end of the lever 25 is moved downwardly out of the path of the ball while the other end of this lever is elevated and the ball is given an impulse causing it to move onto the corresponding runway.

It will be observed that the arms 44, 45 and 46 together with the rods 48 carried thereby are positively locked in their several positions against accidental movement.

What is claimed is:—

1. In a pool ball rack, a carrier for the balls having a pivoted angle member thereon engaged by the balls and provided with means for normally preventing the movement of a ball from said carrier.

2. In a pool ball rack, a carrier for receiving the balls provided with a pivoted angle member, both ends of which are movable above the plane of the ball receiving surface of the carrier.

3. A pool ball rack provided with a carrier movable under the weight of the balls, said carrier being provided with a pivoted angle member having an extension beyond the rear of the carrier, and means movable at will into the path of said extension to move the angle member about its pivot and to arrest the movement of the carrier under the action of the weight of the balls.

4. In a pool ball rack, a plurality of ball receiving runways, a single ball carrier movable into operative relation to any one of the runways, and a pivoted angle member on the carrier engaged by the ball and movable in one direction about its pivot to hold the ball against movement from said carrier and in the other direction to impel the ball from said carrier.

5. In a pool ball rack, a ball carrier movable under the weight of a ball, a series of stops for the carrier and a single actuating means for the stop acting thereon in sequence, said actuating means comprising a slide engaging all the stops and impelling them in successive order, a lever for moving the slide in one direction or the other, and accessible means for moving the lever.

6. In a pool ball rack, a carrier for the balls movable under the weight of the balls, stop members movable into the path of the carrier to determine its extent of travel under the weight of the balls, rock arms for actuating the stops, a sliding plate provided with slots for guiding the rock arms, a lever for moving the sliding plate, and means for yieldingly arresting the movement of the lever in adjusted positions.

7. In a pool ball rack, a carrier for the balls movable under the weight of a ball, stops for determining the extent of movement of the carrier under the weight of a ball, and means for operating the stops comprising rock arms connected to and actuating the stop members, each rock arm having a pin projecting therefrom, a movable plate having a series of slots, each slot receiving a pin on a rock arm and having a portion at an angle to the direction of movement of the plate which portion is differently related to the remainder of the slot than the angle portions of the other slots, and means under the control of an operator for moving said plate.

8. In a pool ball rack, a carrier for receiving the pool balls and movable under the weight of a pool ball, stops for determining the extent of travel of the carrier, a slidable member acting on the stops successively, a lever for moving said slidable member, and a yieldable positioning means for arresting the movement of the lever in adjusted positions.

9. In a pool ball rack, a carrier for the pool balls movable to different extents under the weight of a ball, stops for determining the extent of travel of the carrier, a slide acting on the stops successively, and a counterweighted lever for moving the slide, said lever being provided with a yielding means for arresting its movement in adjusted positions.

10. In a pool ball rack, a carrier movable by the weight of a ball, stops for arresting the movement of the carrier at different points, a sliding member acting on the stops successively, a lever for actuating the sliding member, and provided with a counter-weight on the end remote from that engaging the sliding member, said counter-weight being provided with a series of notches, and a spring finger engaging said notches and yieldingly arresting the movement of the lever in different adjusted positions.

11. In a pool ball rack, a series of inclined runways for the balls, means for directing the balls at will into any one of the runways, a pivoted gate closing the lower ends of all the runways, and an angle lever for moving the gate to the open position and having one end engaging the gate when in the closed position in a direction to lock the gate against movement toward the open position.

12. In a pool ball rack, runways for the balls, a carrier for the balls movable into coincidence with any chosen one of the runways, a charged electric circuit having circuit terminals in normally open position, mechanical means in the path of the balls in chosen ones of the runways and in the path of the balls passing to the carrier, said mechanical means being movable by the balls to cause the closure of the circuit at the circuit terminals and an electric switch for closing the circuit to either set of circuit terminals at will.

In testimony that I claim the foregoing as my own, I have hereto affixed my signature in the presence of two witnesses.

GEORGE FRANK GOSS.

Witnesses:
J. L. LAWSON,
C. E. PREINKERT.